April 17, 1951     W. L. BRACKENBURY ET AL     2,549,165
SPARK GAP SETTING DEVICE
Filed May 5, 1947
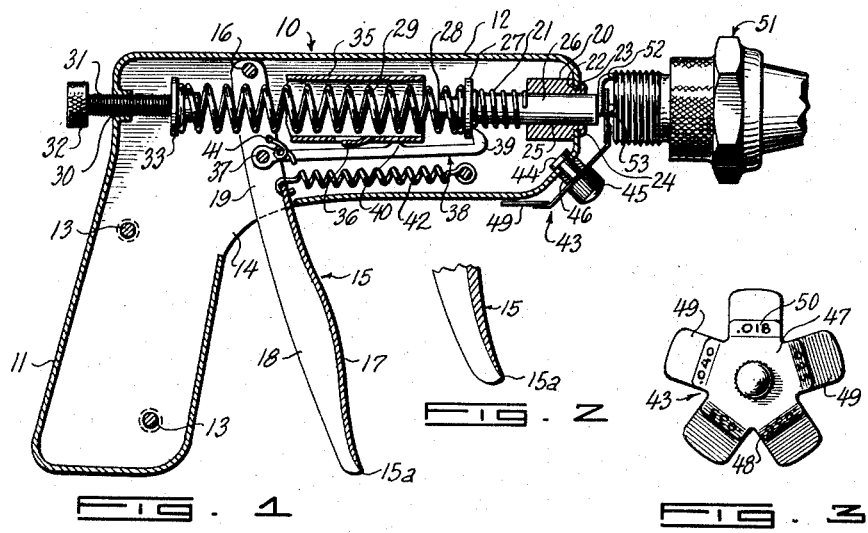
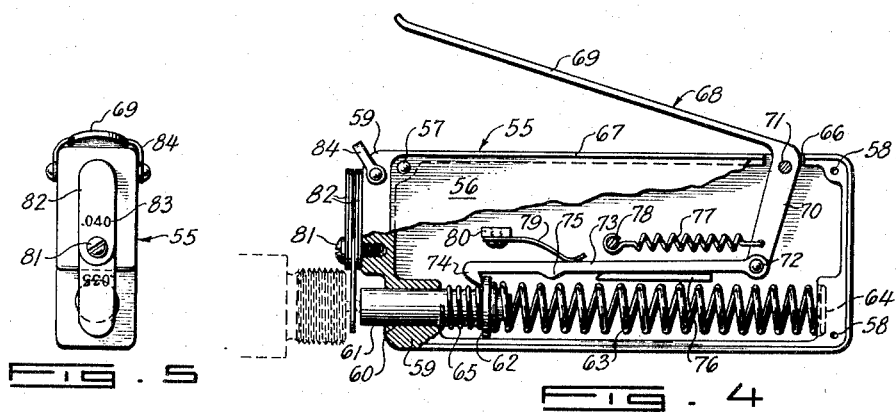
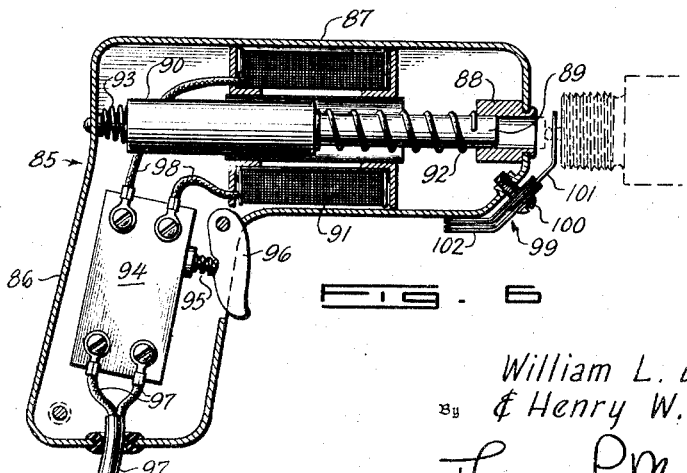
Inventors
William L. Brackenbury
& Henry W. Barnett
By Thomas P. Mahoney, Attorney Patented Apr. 17, 1951

2,549,165

UNITED STATES PATENT OFFICE 2,549,165

SPARK GAP SETTING DEVICE

William Launcelot Brackenbury and Henry W. Barnett, San Diego, Calif.

Application May 5, 1947, Serial No. 745,920

2 Claims. (Cl. 153—48)

This invention relates to improvements in spark gap setting devices and more particularly to a device which is adapted to be used in setting the gap between spark plug electrodes without the use of any other tool or instrument.

At present, the gap between the electrodes of spark plugs is set by inserting a conventional leaf type gauge between the two electrodes which usually comprise a central vertical electrode and a grounded electrode. A hammer or similar instrument is then used to drive the grounded electrode against the gauge in the direction of the central electrode. When the grounded electrode has been driven by the hammer blows against the gauge, the gap is considered to be properly set.

Obviously, the setting of a gap of small dimensions by the crude methods described above possesses several disadvantages. The gap is seldom accurately set and a mere approximation of the desired setting is obtained. Further, the utilization of a hammer or similar heavy instrument to drive the grounded electrode against the gauge and central electrode is apt to injure either the gauge or the electrode.

In addition, there can be no uniform control in the force applied to the electrode and the excessive force of hammer blows upon the electrode will shatter the ceramic core in which the electrode is mounted. Of course, under any circumstances the customary manner of setting spark plug gaps is a time consuming task involving, as it frequently does, a search for both hammer and leaf gauge prior to setting the gap.

The present invention has been developed to provide a device for the setting of spark plug gaps which embodies gauge means cooperatively associated with force applying means adapted to be applied to the grounded electrode in such a manner that the dangers of injuring the electrode and fracturing the ceramic core are practically eliminated. The force with which the force applying means can be driven against the electrodes can be adjusted and the juxtaposition of the force applying means to and cooperative relationship with the gauge means provide an instrument which permits the more efficient and accurate setting of the spark plug gap in a shorter time than has been heretofore possible.

It is, therefore, an object of the present invention to provide a spark gap setting device which embodies gauge means and force applying means adapted to cooperate with said gauge means to permit the accurate and expeditious setting of the gap between two spark plug electrodes.

Another object of the invention is the provision of a spark gap setting device incorporating gauge means and force applying means with an adjustment means associated with said force applying means adapted to adjust the force with which the force applying means is driven against the electrodes.

An additional object of the invention is the provision of a spark gap setting device which incorporates gauge means of undersize dimensions so that allowance is made for the customary spring back of the grounded electrode after the force applying means has driven it against the gauge and the central electrode.

A further object of the invention is the provision of a spark gap setting device which has embodied therein gauge means which is so associated with the force applying means that it may be easily inserted in the gap between the central electrode and the grounded electrode.

An additional object of the invention is the provision of a spark gap setting device which is small in size, light in weight and can be manufactured and sold at a moderate cost.

Other objects and advantages of the present invention will become apparent from a consultation of the appended specification and the accompanying drawings, in which:

Figure 1 is a vertical sectional view of one embodiment of the present invention;

Figure 2 is an enlarged fragmentary view showing the lower portion of the trigger of the spark plug setting device;

Figure 3 is a vertical elevational view of the gauge wheel which is utilized in conjunction with the embodiment of the invention shown in Figure 1;

Figure 4 is a vertical sectional view of another embodiment of the invention;

Figure 5 is a front elevational view of that embodiment of the invention shown in Figure 4; and Figure 6 is a vertical elevational view of still another embodiment of the present invention.

There is shown in Figure 1 of the drawings one embodiment of the present invention which comprises a housing 10 formed in a conventional gun shape and divided roughly into a grip section 11 and a barrel section 12. The housing 10 may be formed in any desired manner but it is contemplated that it might be stamped out of sheet metal and comprise two similarly shaped sections which are assembled as a unit by means of rivets or similar fasteners 13.

Suspended within the housing 10 and projecting outwardly therefrom through a slot 14 formed in the housing 10 is a trigger 15 which is pivotally mounted upon a pin or rivet 16 which also serves to assist rivets 13 in holding the two halves of housing 10 together. The lower portion of the trigger 15 is formed in substantially channel shape with a forward wall 17 and two side walls 18. However, the upper portion of trigger 15 lying within the confines of housing 10 is bifurcated, with two arms 19 depending from pin 16 to permit the insertion therebetween of mechanism which will be described below.

Mounted in the extreme forward end of barrel portion 12 of housing 10 in the place where the muzzle would ordinarily be located is a support or guide block or means 20 which is of roughly cylindrical shape and may be formed out of metal or any desired material. The block 20 is secured to the housing in a hole 22 formed in the housing 10 by means of a groove 23 formed in the periphery of the forward end of the block 20 and having upper walls 24 which are crimped about the edges of hole 22 to retain block 20 securely therein. Mounted in the block 20, there is a force applying means 26 which consists in an elongated set or hammer of circular cross section, the forward end of which extends beyond the end of hole 25. The rear end of the force applying means or set 26 has formed integrally therewith or fitted thereupon a circular flange member 27 which, with the cooperation of a reduced portion 28 of set 26, provides a seat for an expansion coil spring 29 which constitutes the impulse or force generating means for the set 26. Mounted on the other side of flange 27 and encircling the forward end of the set 26 is a buffer spring or means 21 which is adapted to cushion the propulsive effect of spring or force generating means 29 and to position the flange 27 of set 26 in a predetermined location within the housing 10 for a purpose to be described below. Mounted in the rear of the housing 10 on a threaded orifice 30 formed therein is an adjustment screw 31 having a knurled knob 32 at its rear end and a flanged seating member 33 at its forward end which is adapted to provide a seat for the end of expansion spring 29. The turning of the knob 32 will cause the screw 31 to be advanced into or withdrawn from the interior of housing 10 and the consequent longitudinal movement of the flanged seating member 33 will result. This movement of seating member or element 33 on the end of adjustment screw 31 permits the adjustment of the force exerted upon the set 26 by increasing or decreasing the pressure brought to bear upon the end of spring or force generating element 29. Thus, the force of the blow delivered by the set 26 can be adjusted to conform to the size of the electrodes whose spark gap is being set with the spark gap setting device.

A spring guide or channel 35 which prevents the mislocation of the spring 29 is mounted within the housing 10. In the underside of spring guide 35 there is formed a cam plate 36 which projects downwardly from the surface of the channel and which, in the present embodiment, consists of a punched out section of the spring guide 35 itself.

Pivotally supported on a pin 37 which extends between the arms 19 of trigger 15 is a detent means 38 which consists in an elongated member having a hook-like detent portion 39 at the end opposite to its suspension point. Formed integrally therewith on the upper side thereof is a projection or boss 40 which is adapted to cooperate with cam plate 36 in a manner which will be described below. Hook-like detent portion 39 of detent means 38 is adapted to catch on flange 27 and be retained in contact with said flange by the action of spring 41 which has one end secured in one of the arms 19 of trigger 15 and its other end wrapped around the body of detent means 38 in such a manner that the detent means 38 is biased in an upward direction causing the hook-like detent portion 39 of detent means 38 to bear against flange 27. The action of buffer spring 21 serves to position flange 27 in such a position within housing 10 that the detent portion 39 of detent means 38 can register properly with said flange 27.

A spring 42 which has one end secured to a rivet or pin supported within the interior of housing 10 has its other end attached to the forward wall 17 of trigger 15. Thus, the trigger 15 is always carried forward by means of the action of spring 42 and detent means 38 is also carried forward on arms 19 of trigger 15 to permit its detent portion 39 to be biased, through the acting spring 41, against flange 27 of set 26. Trigger 15 is thus returned by spring 42 to the cocked position.

Mounted on the forward end of housing 10 immediately below the point where the forward end of the set 26 protrudes from support block 20, there is located a gauge member 43 which is adapted to cooperate with the set 26 to set the spark gap between the electrodes of a spark plug. Gauge member 43 is mounted on the exterior of housing 10 through the medium of a threaded screw 44 which has threadedly engaged upon the shaft thereof a knurled nut 45 adapted to retain gauge member 43 in a predetermined relation to housing 10. A collar 46 which fits about the shaft of bolt 44 on the underside of gauge member 43 is adapted to control the rotation of gauge member 43 on bolt 44 in cooperation with nut 45. Gauge member 43 includes a central portion 47 having arranged about its periphery instruck integral tabs 48 upon which are adapted to be mounted, as by means of brazing, individual leaf gauges 49. Indicia 50 which indicate the size of the individual gauges are stamped, engraved, embossed or otherwise applied to the tabs and permit the proper size gauge to be selected. There is provided in the lower end of handle 15 and formed by the forward wall thereof a gap opener or electrode spreader 15a which is adapted to be inserted between the electrodes of a spark plug to permit the gap to be increased prior to the proper setting of the gap.

When the gap of a spark plug, indicated generally at 51, is to be set the grounded electrode 52 is brought to bear against the end of set 26. Knurled nut 45 is released and gauge member 43 is rotated to permit the proper leaf gauge 49 to be inserted between grounded electrode 52 and central electrode 53. The trigger 15 is then compressed causing the detent means 38 to draw the set 26 backward against the force of spring or force generating means 29, by means of the contact between detent portion 39 and flange 27. As the trigger 15 is drawn backward the spring or force generating means 29 is progressively compressed until the projection or boss 40 on detent means 38 comes into contact with the cam plate or member 36 formed on the under side of spring guide 35. The contact of boss 40 with cam member 36 forces the hook-like detent portion 39 off the flange 27 and permits the spring or force generating means 29 to drive the set 26 against the grounded electrode 52 forcing it against the leaf gauge 49 which is backed up by the central electrode 53. The gap between the two electrodes is thus set to the desired dimension and the leaf gauge 49 can be removed from the gap. Since there is a certain amount of spring back in the grounded electrode 52 the leaf gauges 49 can be slightly undersize to a slightly undersize gap to be formed which will be compensated for by the spring back of the grounded electrode 52. Because the spark plug is held in the hand while its gap is set the hand provides a certain shock absorbing effect which assists in preventing and eliminating danger of damage to the plug.

There is shown in Figure 4 another embodiment of the present invention. It comprises a substantially rectangular housing 55 which may be formed by die-casting, stamping, or any other suitable means. A cover plate 56 is adapted to be so mounted on the housing 55 as to form a side wall thereof. This is accomplished through the utilization of rivets 57 or similar fasteners driven into holes 58 formed in the body of the housing. The forward end 59 of housing 55 is considerably heavier in structure than the other walls of the housing and has formed in the lower portion thereof a longitudinal bore or orifice 60 which has slidably mounted for reciprocal action therein a force applying means, set or hammer 61 of circular cross section. Formed integrally with the set 61 or mounted thereupon is a flange 62 which is adapted to serve as a seat for one end of a coil spring or force generating means 63, the other end of which is seated in a depression 64 formed in the end wall of housing 55. A buffer spring 65 lies on the other side of flange 62 and encircles set 61. Buffer spring 65 serves to cushion the force of spring 63 and to return flange 62 to a predetermined place within the housing 55 for a purpose to be described below.

A slot or opening 66 is formed in the upper wall 67 of housing 55 near the rear end thereof and a trigger 68 having a grip portion 69 and a lever portion 70 is adapted to be inserted therethrough. Trigger 68 is pivotally mounted on a pin or boss 71 located near the slot 66 and has pivotally suspended from the lower end of its lever portion 70, as by means of a pin 72, one end of a detent means 73 which consists in an elongated element or shaft having a hook-like detent portion 74 at its other end and a projection or boss 75 formed on its under side. The hook-like detent portion 74 of detent means 73 is adapted to cooperate with flange 62 in such a manner that when the trigger 68 is compressed against the upper wall 67 of the housing 55 the detent means 73 is drawn back and the flange 62 is drawn back by the movement of detent portion 74 of detent means 73. The spring 63 is thus compressed. An elongated boss 76 formed on the housing 55 serves as a spring guide and cam plate and cooperates with the projection 75 on the under side of detent means 73.

Thus, when the detent means 73 has been drawn back by the compression of the trigger 68 to the point where the projection 75 on detent means 73 rides over and against the cam plate 76 the flange 62 is released by detent portion 74 permitting the compressed spring or force generating means 63 to drive the set 61 against the electrodes of the spark plug whose gap is being set. A spring 77 has one end secured to the lever portion 70 of trigger 68 and its other end secured to a boss or pin 78 in housing 55. After the set 61 has been driven forward by the action of springs 63 the temporary release of grip portion 69 of trigger 68 will permit the spring 77 to draw the lever portion 70 of trigger 68 forward, driving the detent means 73 forward to permit the detent portion 74 of detent means 73 to catch on flange 62. Flange 63 has been positioned in a predetermined position within the housing 55 by the action of buffer spring 65 so that the detent portion 74 of detent means 73 may catch on flange 62. A leaf spring 79 mounted on a boss 80 is biased against the upper side of detent means 73 and serves to drive the detent portion 74 of detent means 73 into contact with flange 62 of set 61.

Mounted on the forward end 59 of housing 55 as by means of a screw 81 are a number of leaf type gauges 82 any one of which is adapted to be selected by means of indicia 83 on the face of the gauge and rotated on the screw 81 to a point where it is juxtaposed to the set 61. The spark plug electrodes may be fitted about the gauges, the trigger compressed and the set will adjust the gap to proper dimensions. A bail 84 attached to the top of forward end of housing 59 serves to hold the trigger 68 against the top wall 67 of housing 55 when the spark gap setting device is not in use.

In Figure 6 there is shown an electrically actuated spark gap setting device constructed in accordance with the present invention. It comprises a two part housing 85 having a grip portion 86 and a barrel portion 87. Secured in the forward end of barrel portion 87 of housing 85 is a support block 88 which has slidably mounted therein a set, hammer or force applying device 89. The rear end of set 89 is enlarged and forms a solenoid plunger 90 which is surrounded by a solenoid winding 91 suitably mounted in the interior of housing 85. The solenoid assembly which includes plunger 90 and winding 91 constitutes the force generating mechanism which serves to drive the set 89 forward when it is actuated, as will be described below. Surrounding the periphery of set 89 and seated at its forward end on support block 88 and at its rear end on solenoid plunger 90 is a coil spring 92 which drives the solenoid plunger 90 into its inactive position. A buffer spring 93 prevents the end of the solenoid plunger 90 from being driven against the wall of housing 85 when returned by the action of spring 92.

Mounted within the grip portion 86 of housing 85 is a switch member 94 which has mounted in one side thereof a plunger and spring combination 95 which is in contact with a trigger 96 pivotally supported within the housing 85 which is adapted to depress the plunger and spring combination 95 to close the switch. Power leads 97 are connected to the base of the switch and leads 98 are adapted to conduct current from the switch to the solenoid winding 91. Mounted on the forward end of housing 85 contiguous to mounting block 88 is a group of leaf gauges 99 which are supported upon a screw 100. Each of the gauges comprises a central mounting portion 101 and an instruck gauge portion proper 102. The profile of the gauges presents the appearance of an obtuse angle.

The electrical spark gap setting device is utilized in a manner essentially similar to that in which the above described embodiments are used. A leaf gauge is rotated in front of the set 89, the trigger 96 is compressed, the switch 94 closed, the solenoid assembly activated and the set 89 driven against the electrodes to set the proper gap.

There is thus provided by the present invention a spark gap setting device which is simple to use, easy to manufacture and which accurately sets the gaps of a wide variety of spark plugs. The above described embodiments of the present invention have been described in the specification and shown in the drawings to illustrate the manner of construction and mode of operation of the device and it is not intended that the invention be limited to the specific details of construction described and shown since it is obvious that changes in such details could be made which would still fall within the scope of the appended claims.

We claim:

1. In a spark gap setting device for spark plugs: a housing; force generating means mounted within said housing, said force generating means including resilient means, detent means mounted on a trigger and movable thereby, and release means adapted to disengage said detent means as said trigger moves said detent means thereacross; force applying means associated with and adapted to be actuated by said force generating means, said force applying means including a seat engageable by one end of said resilient means and said detent means so that said detent means when moved by said trigger will cause the movement of said force applying means to compress said resilient means and said release means being adapted to disengage said detent means from said seat to permit the expansion of said resilient means subsequently to the compression thereof; and gauge means mounted upon said housing in operative relationship with said force applying means to provide a predetermined gap between the electrodes of said spark plug.

2. A spark gap adjusting tool adapted to set the electrodes of a spark plug comprising: a housing; resilient force generating means mounted within said housing; force applying means having one end in contact with said force generating means; trigger means mounted on said housing; detent means mounted on said trigger means and adapted to compress said force generating means when moved by said trigger means; release means for engaging said detent means to disengage said detent means to permit said force generating means to expand and drive said force applying means against one of said electrodes; and gauge means including a plurality of different sized gauge members rotatably mounted for manual rotation upon a common pin fixed in said housing for cooperation with said force applying means in adjusting said gap.

WILLIAM LAUNCELOT BRACKENBURY.
HENRY W. BARNETT.

REFERENCES CITED

The following references are of record in the file of this patent:

UNITED STATES PATENTS

| Number | Name | Date |
| --- | --- | --- |
| 519,662 | Carpenter | May 8, 1894 |
| 1,703,618 | Groehn | Feb. 26, 1929 |
| 1,798,378 | Kott | Mar. 31, 1931 |
| 1,985,410 | Isaacs | Dec. 25, 1934 |
| 2,193,886 | Schultz | Mar. 19, 1940 |
| 2,215,333 | Mosthaf | Sept. 17, 1940 |